US012006841B2

(12) United States Patent
Postec et al.

(10) Patent No.: US 12,006,841 B2
(45) Date of Patent: Jun. 11, 2024

(54) HYBRIDIZATION OF THE FIBERS OF THE FIBROUS REINFORCEMENT OF A FAN BLADE WITH ELASTIC FIBERS

(71) Applicant: Safran Aircraft Engines, Paris (FR)

(72) Inventors: Clément Pierre Postec, Moissy-Cramayel (FR); Thomas Alain De Gaillard, Moissy-Cramayel (FR); Guillaume Pascal Jean-Charles Gondre, Moissy-Cramayel (FR); Pierre-Antoine Gérard Joseph Barbier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/025,859

(22) PCT Filed: Aug. 31, 2021

(86) PCT No.: PCT/FR2021/051501
§ 371 (c)(1),
(2) Date: Mar. 10, 2023

(87) PCT Pub. No.: WO2022/053753
PCT Pub. Date: Mar. 17, 2022

(65) Prior Publication Data
US 2023/0358143 A1     Nov. 9, 2023

(30) Foreign Application Priority Data

Sep. 11, 2020  (FR) ...................................... 2009192

(51) Int. Cl.
*F01D 5/28* (2006.01)
(52) U.S. Cl.
CPC ........ *F01D 5/282* (2013.01); *F05D 2300/603* (2013.01)

(58) Field of Classification Search
CPC . F01D 5/147; F01D 5/28; F01D 5/282; B29C 70/24
See application file for complete search history.

(56) References Cited

U.S. PATENT DOCUMENTS 4,902,548 A * 2/1990 Cholat-Serpoud ....... A63C 5/12
280/610
5,839,882 A * 11/1998 Finn ........................ F01D 5/147
416/229 A
(Continued)

FOREIGN PATENT DOCUMENTS

FR      3 040 909 A1     3/2017
FR      3 087 699 A1     5/2020

OTHER PUBLICATIONS

French Search Report for French Application No. 2009192, dated Apr. 30, 2021.
(Continued)

*Primary Examiner* — Woody A Lee, Jr.
*Assistant Examiner* — Cameron A Corday
(74) *Attorney, Agent, or Firm* — BIRCH, STEWART, KOLASCH & BIRCH, LLP

(57) ABSTRACT

The present invention relates to a fan blade of a turbomachine comprising a structure made of composite material comprising a fibrous reinforcement obtained by three-dimensional weaving of strands and a matrix in which the fibrous reinforcement is embedded, which comprises a first portion forming the suction-side wall and a second portion forming the pressure-side wall, the strands of the fibrous reinforcement comprising first strands comprising carbon or aramid fibres, the Young's modulus of which is greater than 250 GPa, and second strands produced from a viscoelastic material and having a Young's modulus less than 10 GPa,
(Continued)

the first portion comprises uniquely first strands whereas the second portion comprises second strands.

13 Claims, 3 Drawing Sheets

(56) References Cited

U.S. PATENT DOCUMENTS

| | | | | |
|---|---|---|---|---|
| 2011/0002790 | A1* | 1/2011 | Ebert | F01D 5/282 |
| | | | | 416/241 A |
| 2011/0176927 | A1* | 7/2011 | Alexander | F04D 29/324 |
| | | | | 29/889.71 |
| 2019/0113052 | A1* | 4/2019 | Pollack | F04D 29/668 |
| 2021/0372428 | A1 | 12/2021 | De Gaillard et al. | |
| 2022/0074309 | A1* | 3/2022 | Dambrine | F01D 25/005 |
| 2022/0364474 | A1* | 11/2022 | Salas De Los Rios | |
| | | | | B29D 99/0025 |

OTHER PUBLICATIONS

International Search Report for International Application No. PCT/FR2021/051501, dated Jan. 11, 2022.

* cited by examiner

HYBRIDIZATION OF THE FIBERS OF THE FIBROUS REINFORCEMENT OF A FAN BLADE WITH ELASTIC FIBERS

FIELD OF THE INVENTION

The invention generally relates to the field of turbomachines, and more particularly that of the fan blades of these turbomachines and the manufacturing method thereof.

The invention applies more particularly to fan blades made of composite material and their interaction with the inlet of the primary flow path.

STATE OF THE ART

Turbomachine blades, and in particular fan blades, undergo significant mechanical and thermal stresses and must meet strict weight and space requirement conditions. It has therefore been proposed to use blades made of a composite material including a fibrous reinforcement densified by a polymer matrix, which are lighter compared to metal blades with equivalent propulsive characteristics and which have satisfactory heat resistance.

During the certification and life of an engine, fan blades are subject to bird and hailstone ingestion. However, depending on the type of object impacting the blade (and in particular its size, its mass) and depending on the type of fan (rotation speed and number of blades), the preferred areas of initiation and propagation of damage are different. The mechanical behavior of the fan blades is therefore optimized during the blade design phase to comply with certification rules.

Moreover, current designs tend to reduce the thickness of the structure made of composite material of the blades in the areas of the leading edge, of the trailing edge or even over the whole of the structure in order to improve the aerodynamic performance. At iso-material and iso-law of stacking, the ability of the blade to withstand an impact is consequently reduced.

Document FR3087701 in the name of the Applicant describes a fan blade of a turbomachine comprising a fibrous reinforcement obtained by three-dimensional weaving of strands comprising a first portion forming the leading edge and a second portion forming all or part of the trailing edge. This document proposes in particular a hybridization of the strands of the fibrous reinforcement to make the best use of the mechanical properties of each strand according to the areas of the blade and the type of stress, which allows to effectively improve the behavior under ingestion of the blade. More precisely, the strands of the fibrous reinforcement comprise first strands having a predefined elongation at break, the function of which is to allow to comply with the design criteria of the blade, and in particular the frequency status of the blade, and second strands having an elongation at break greater than that of the first strands (typically, between 1.5 and 3 times the elongation at break of the first strands) and which have the function of limiting the initiation and propagation of damage to the blade during ingestion of objects, especially birds. The first portion comprises all or part of the first strands whereas the second portion comprises all or part of the second strands.

In operation, the Applicant noticed the fact that, during ingestion of objects in the fan, the warp strands of the fibrous reinforcement were likely to crack in the impact area, whereas the warp and weft strands were liable to crack by wave propagation at the trailing edge and the tip of the blade. However, when designing a blade, it is necessary to optimize the resistance of the blade during ingestion of an object by giving it sufficient flexibility to limit the risks of propagation of cracks, but also its mechanical and aerodynamic resistance, which concern the static movement of the blade (untwisting, clearance, etc.) and which, on the contrary, requires the blade to have maximum stiffness.

DISCLOSURE OF THE INVENTION

An object of the invention is to overcome the aforementioned disadvantages, by proposing a fan blade for a turbomachine whose behavior on ingestion is improved.

For this purpose provision is made, according to a first aspect of the invention of a fan blade of a turbomachine comprising a structure made of composite material comprising a fibrous reinforcement obtained by three-dimensional weaving of strands and a matrix in which the fibrous reinforcement is embedded, the structure made of composite material comprising a pressure-side wall and a suction-side wall, the fibrous reinforcement comprising a first portion forming the suction-side wall and a second portion forming the pressure-side wall, and the strands of the fibrous reinforcement comprising first strands comprising carbon or aramid fibers the Young's modulus of which is greater than 250 GPa. The strands of the fibrous reinforcement further comprise second strands produced from a viscoelastic material and having a Young's modulus less than 10 GPa. Moreover, the first portion comprises uniquely first strands whereas the second portion comprises second strands.

Certain preferred but non-limiting characteristics of the fan blade according to the first aspect are the following, taken individually or in combination:
- the second portion has no first strands;
- the blade further comprises a vane with an aerodynamic profile capable of extending in an air flow having a determined height, the second portion extending over at most 60% of the height of the vane from a tip of said vane;
- the second portion comprises a damping area extending over a portion of chord length comprised between zero percent and sixty percent of the chord;
- the second portion comprises a confinement area comprising a trailing edge and a tip of the blade and extending over a portion of chord length at most equal to 10% of the chord;
- the blade further comprises a vane with an aerodynamic profile capable of extending in an air flow having a determined height, the confinement area of the second portion extending over at most 30% of the height of the vane from the tip of the vane;
- the fibrous reinforcement further comprises a third portion extending between the first portion and the second portion, a density of the second strands gradually increasing in the third portion from the first portion towards the second portion; and/or
- the viscoelastic material comprises at least one of the following materials: an elastomer, polyurethane, rubber.

According to a second aspect, the invention also proposes a fan for a turbomachine comprising a plurality of blades according to the first aspect, a turbomachine comprising such a fan and an aircraft comprising this turbomachine.

DESCRIPTION OF THE FIGURES

Other characteristics, objects and advantages of the invention will emerge from the description which follows, which is purely illustrative and not limiting, and which must be read in conjunction with the appended drawings in which.

In all the figures, similar elements bear identical references.

DETAILED DESCRIPTION OF THE INVENTION

Figure 1:
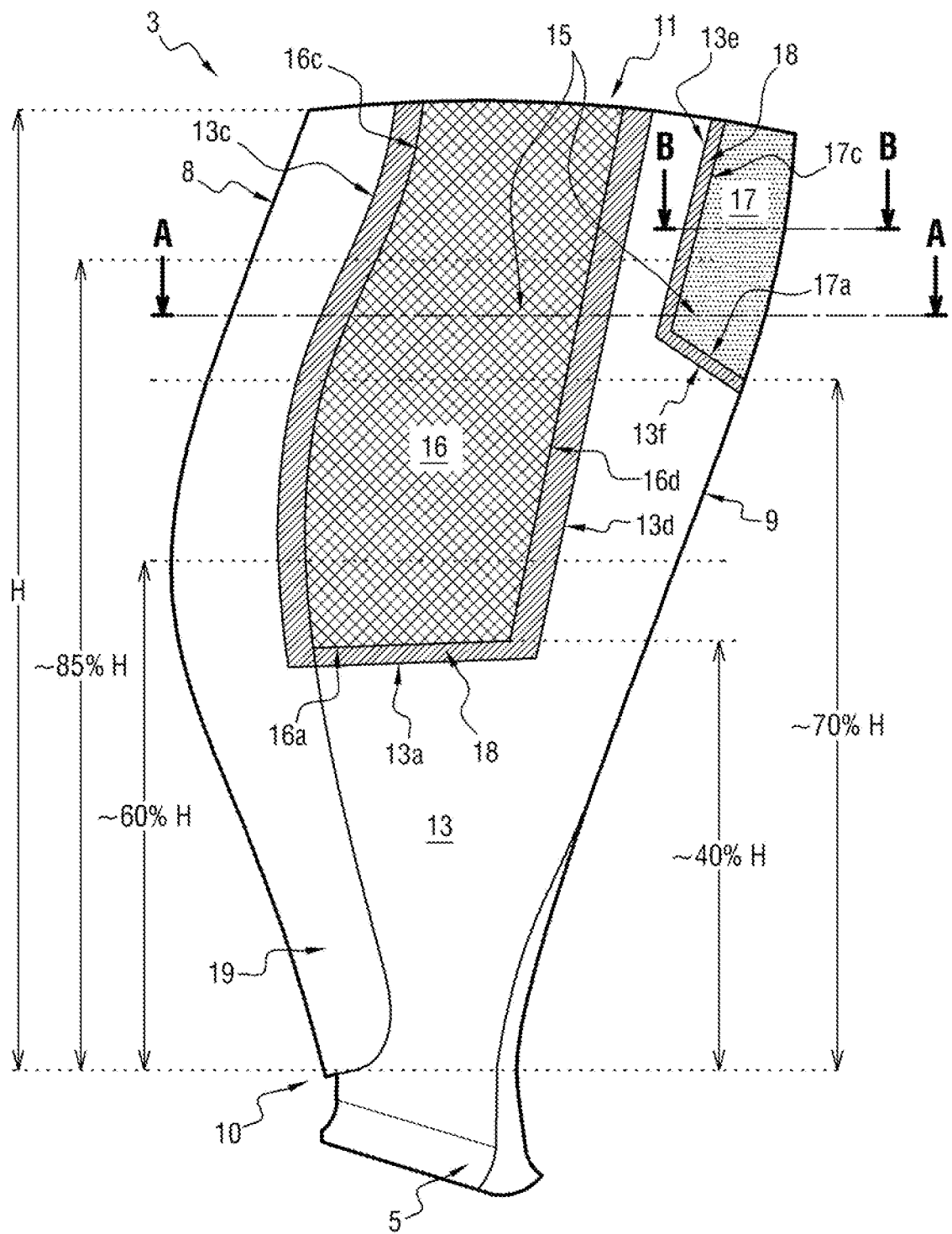
FIG. 1 schematically illustrates an example of a fan blade according to one embodiment of the invention.

In the present application, the upstream and the downstream are defined with respect to the normal flow direction of the gas in the fan 1 through the turbomachine. Moreover, the axis of revolution of the fan 1 turbomachine is called the axis X of radial symmetry of the fan 1. The axial direction corresponds to the direction of the axis X of the fan 1 and a radial direction is a direction perpendicular to this axis and passing therethrough. Finally, use will be made of inner and outer (or internal and external), respectively, with reference to a radial direction so that the inner part or face of an element is closer to the axis X than the outer part or face of the same element.

A turbomachine fan 1 comprises a fan 1 disk 2 carrying a plurality of fan 1 blades 3, associated with inter-blade platforms.

Each blade 3 comprises a structure made of composite material including a fibrous reinforcement 4 obtained by three-dimensional weaving and a matrix in which the fibrous reinforcement 4 is embedded.

This structure made of composite material comprises a root 5 and a vane 7 with an aerodynamic profile. The root 5 is intended to allow the blade to be fixed to the fan disk 2 and extends for this purpose between a bottom of an indentation formed in the disk 2 and the inter-blade platforms. The vane 7 with an aerodynamic profile is in turn suitable for being placed in an air flow, when the turbomachine is in operation, in order to generate lift.

The blade 3 also comprises, in a manner known per se, a leading edge 8, a trailing edge 9, a pressure-side wall 6a and a suction-side wall 6b. The leading edge 8 is configured to extend opposite the flow of gases entering the turbomachine. It corresponds to the front part of an aerodynamic profile which faces the airflow and which divides the airflow into a pressure-side flow and a suction-side flow. The trailing edge 9 in turn corresponds to the rear part of the aerodynamic profile, where the pressure-side and suction-side flows meet. Optionally, the blade 3 further comprises a metal shield 19 attached and fixed to the leading edge 8.

Finally, the structure is formed of a plurality of blade sections stacked from the root 5 to a tip 11 along a stacking axis Z extending radially relative to the axis of revolution X of the fan 1.

In what follows, "height" will designate a distance along the stacking axis Z.

Thus, the vane 7 has a height H corresponding to the distance along the stacking axis Z between its lower limit 10, at the interface with the root 5, and its tip 11. The height H of the vane 7 can for example be measured at the intersection between the leading edge 8 and the lower limit 10 of the vane 7.

The fibrous reinforcement 4 can be formed from a fibrous preform made in one piece obtained by three-dimensional or multilayer weaving with varying thickness. It comprises warp and weft strands which may in particular comprise carbon, glass, basalt and/or aramid fibers. The matrix in turn is typically a polymer matrix, for example epoxy, bismaleimide or polyimide. The blade 3 is then formed by molding by means of a vacuum resin injection method of the RTM (for "Resin Transfer Molding"), or else VARRTM (for Vacuum Resin Transfer Molding) type.

The strands forming the fibrous reinforcement 4 comprise first strands 12 comprising carbon or aramid fibers the Young's modulus of which is greater than 250 GPa and second strands 14 produced from a viscoelastic material and having a Young's modulus less than 10 GPa. The fibrous reinforcement 4 is therefore obtained by hybridization of the strands 12, 14 constituting it in order to make the best use of the mechanical properties of each strand 12, 14 according to the areas of the blade 3 and the type of stress.

The function of the first strands 12 is to allow to comply with the design criteria of the blade 3, and in particular the frequency status of the blade 3. These first strands 12 are therefore used in the weaving of the fibrous reinforcement 4 to form the portion of the reinforcement 4 (or first portion 13) which globally comprises the suction-side wall 6b of the blade 3. Preferably, the first portion 13 also comprises the lower parts and the thick parts of the blade 3, so that the eigenfrequencies of the blade 3 are high, to ensure the resistance of the blade 3 to centrifugal forces and to avoid displacements at the tip 11 of the blade in order to improve the dynamic performance. Thus, this allows to limit or at least to move away the frequency crossings between the first eigenmodes of the blade 3, energetic crossings, and the engine harmonics. The lower parts and the thick parts of the blade 3 here comprise the root 5 of the blade 3, the core of the blade 3 (area located between the pressure-side wall 6a and the suction-side wall 6b), a lower part of the vane 7, the leading edge 8 and a lower part of the trailing edge 7.

The second strands 14 in turn, the Young's modulus of which is much lower than the first strands 12, have the function of absorbing part of the impact energy of an object (such as a bird) and thus of limiting the damage to the blade 3 in the event of ingestion. In particular, the second portion 15 has the function of limiting wave propagation towards the trailing edge 9 and therefore its damage. The choice of second strands 14 in a viscoelastic material having a very low Young's modulus compared to the first strands 12 allows to absorb the impact energy. These second strands 14 are therefore used in the weaving of the fibrous reinforcement 4 to form a portion of the reinforcement 4 (or second portion 15) which comprises all or part of the pressure-side wall 6a and an upper part of the trailing edge 9, insofar as these areas are highly stressed in the event of ingestion of an object. In particular, the Applicant has noticed that in the event of an object impact, the warp strands of the pressure-side wall 6a of the blade 3 could crack and create decohesions by shock and that the warp strands forming the trailing edge 9 and the weft strands forming the tip 11 of the blade could crack by wave propagation, at the tip 11 of the blade 9. If necessary, only the second strands 14 are used as warp and/or weft strands in the weaving of the second portion 15.

The second strands 14 can comprise warp (that is to say strands extending along the stacking axis Z of the blade sections 3) and/or weft strands of the reinforcement 4 (this is that is to say strands extending globally in the direction of the chord C of the blade 3). Moreover, the second portion 15 preferably extends in an upper area of the blade 3 (which will be detailed later in the description), from the tip 11 of the blade 3.

The reinforcement 4 further comprises an intermediate portion 18 extending between the first portion 13 and the second portion 15 which is formed both by the first strands 12 and the second strands 14. Preferably, only the first and second strands 12, 14 are used as warp and weft strands in the weaving of the intermediate portion 18.

This intermediate portion 18 is configured to serve as an interface between the first portion 13 and the second portion 15 in order to limit the weaknesses due to material discontinuities. When the fibrous reinforcement 4 comprises uniquely first strands 12 in the first portion 13 of the blade 3 and uniquely second strands 14 in the second portion 15 of the blade 3, and the first portion 13 and the second portion 15 are end to end in the reinforcement 4, the fibrous reinforcement 4 thus obtained effectively allows to avoid damage to the blade 3 in the areas comprising the second strands 14. However, the Applicant has noticed the fact that in the absence of intermediate portion 18, that is to say by abruptly introducing second strands 14 and simultaneously removing the first strands 12 at the interface between the first portion 13 and the second portion 15 of the fibrous reinforcement 4, the blade 3 obtained risked being severely damaged at this interface in the event of an impact, because the interface between the two portions 11, 12 of the reinforcement 4 is weakened by the strong discontinuity of the material properties.

The intermediate portion 18 thus allows to make a transition between the material properties of the first portion 13 and the material properties of the second portion 15. For this purpose, the density of the second strands 14 is gradually increased within the intermediate portion 18 of the first portion 13 to the second portion 15. More specifically, at the interface between the first portion 13 and the intermediate portion 18, the density of the second strands 14 is very low whereas the density of the first strands 12 is very high. On the other hand, at the interface between the intermediate portion 18 and the second portion 15, the density of the second strands 14 is very high whereas the density of the first strands 12 is very low.

The second portion 15 comprises a damping area 16 extending away from the leading edge 8 and the trailing edge 9 of the blade 3 and configured to dampen the impacts of objects and limit the risks of cracking of the strands of the fibrous reinforcement by decohesion. In one embodiment, the damping area 16 extends over a portion of chord length C comprised between zero and sixty percent of the chord C, over its entire height (that is to say at any point of the stacking axis Z within the damping area 16). Conventionally, by chord C, it will be understood here, for a given section of the blade 3 (and therefore for a given point of the stacking axis Z), the line segment connecting the leading edge 8 to the trailing edge 9 of the blade 3.

Figure 2:
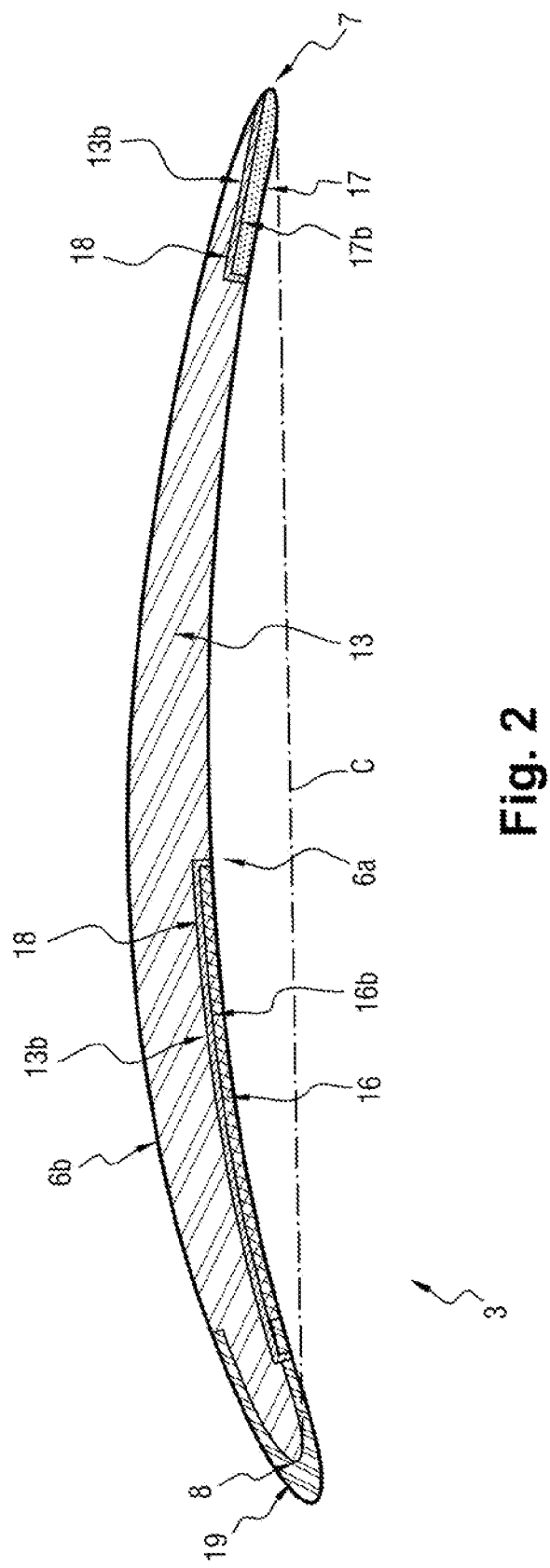
FIG. 2 is a sectional view of the blade of FIG. 1 along the axis A-A.

If necessary, the damping area is partly covered by the metal shield 19 of the leading edge of the blade 3. In this case, the damping area may have a thickness that changes along the chord C so that the free face of the pressure-side wall 6a of the blade 3 is flat and continuous at the interface between the downstream edge of the metal shield 19 and the damping area 16 (see FIG. 2).

In order to comply with the design criteria of the blade 3, the damping area 16 only extends over part of the height H of the vane 7, preferably in the upper area of the vane 7. For this purpose, the damping area 16 of the second portion 15 extending over approximately 60% of the height H of the vane 7, from the tip 11 of the vane 7. In other words, the damping area 16 forms the pressure-side wall 6a of the blade 3 from 40% in height to 100% in height of the vane 7. The Applicant has determined that the critical height for heavy birds is approximately 40% of the height of the vane 7 and that the critical height for medium birds is approximately 85% of the height of the vane 7. This extension of the damping area 16 thus allows to cover both the impact areas of the heavy birds and the medium birds.

The second portion 15 further comprises a confinement area 17 configured to prevent the propagation of waves in the event of impact and thus to avoid cracking of the weft and warp strands of the fibrous reinforcement 4. For this purpose, the confinement area 17 covers the portion of the pressure-side wall 6a which comprises part of the trailing edge 9 and the tip 11 of the blade 3 and extends over a portion of chord length C equal to at most 10% of the chord. In addition, still to comply with the design criteria of the blade 3, the confinement area 17 of the second portion 15 extending over approximately 30% of the height of the vane 7 from the tip 11 of the vane 7. In other words, the damping area 16 forms the pressure-side wall 6a of the blade 3 from 70% in height to 100% in height of the vane 7.

It will of course be noted that the position and the extension (height, length and thickness) of the damping and confinement areas 16, 17 of the second portion 15 can be optimized on a case-by-case basis depending on the loads undergone by the blade 3, the height H of the vane 7 and the number of blades 3 in the fan 1 (and more generally the type of turbomachine into which the fan 1 is integrated). Preferably, the damping area 16 and the confinement area 17 are separate.

The dimensions of the intermediate portion 18 are determined according to the dimensioning of the blade 3, and therefore of the type of fan 1 and more generally of turbomachine into which it is intended to be integrated. The height (dimension along the stacking axis Z) of the intermediate portion 18 is comprised between 5% and 30% of the height H of the vane 7. Thus, the height of the intermediate portion 18 can be comprised between one centimeter and ten centimeters. Furthermore, over the entire height of the second portion 15, the thickness (dimension along an axis perpendicular to the chord C and to the stacking axis Z) of the intermediate portion 18 may be comprised between 5% and 30% of the thickness of the fibrous reinforcement 4.

FIG. 1 schematically represents a blade 3 the fibrous reinforcement 4 of which has been shaped from a three-dimensional woven fibrous preform, before resin injection or densification by a die and optional machining, in order to obtain a fan 1 blade 3 made of composite material according to the invention. By three-dimensional weaving, it will be understood that the warp strands follow sinuous paths in order to bind together weft strands belonging to different layers of weft strands, except for unbindings, it being noted that a three-dimensional weave, in particular with an interlock weave, may include surface 2D weaves. Different three-dimensional weaving patterns can be used, such as interlock, multi-satin or multi-veil weaves, for example, as described in particular in document WO 2006/136755.

In a first embodiment, the blade 3 comprises the first portion 13, the second portion 15 and the intermediate portion 18, the first portion 13 comprising only the first strands 12. To simplify the description of the different portions 13, 15, 18 of the fibrous reinforcement 4, "horizontal" will designate a direction along the chord C of the blade 3 and "vertical" a direction along the stacking axis Z.

As indicated above, the second portion 15 forms part of the pressure-side wall 6a and comprises the damping area 16 and the confinement area 17. The damping area 16 of the second portion 15 extends from a first "horizontal" lower limit 16a, which can be located at approximately 40% of the height H of the vane 7, as far as the tip 11 of the blade 3. The damping area 16 also extends from the free face of the pressure-side wall 6a over a given depth up to a first "vertical" inner limit 16b (that is to say generally along the stacking axis Z), within the fibrous reinforcement 4, and over a chord C length portion comprised between zero percent and sixty percent of the chord C, at a distance from the leading edge 8 and the trailing edge 9, between a first "vertical" upstream limit 16v and a first "vertical" downstream limit 16d.

The confinement area 17 of the second portion 15 extends from a second "horizontal" lower limit 17a, which can be located at approximately 70% of the height H of the vane 7, as far as the tip 11 of the blade 3. The confinement area 17 also extends from the free face of the pressure-side wall 6a to a given depth up to a second "vertical" inner limit 17b (which may be at the same depth as the first inner limit 16b) and over a chord C length portion at most equal to 10% of the chord from the trailing edge 9, to a second "vertical" upstream limit 17c. Optionally, as illustrated in FIG. 1, the second lower limit 17a can be inclined with respect to the chord C, so that the height of the confinement area 17 at its second upstream limit 17c is greater than its height at the trailing edge 9.

The first portion 13 forms the root 5 of the blade 3, a lower part of the vane 7 extending from the root 5 to a third "horizontal" lower limit 13a (which is closer to the root 5 than the first "horizontal" lower limit). The first portion 13 further comprises the upper part of the vane 7, with the exception of the damping 16 and confinement 17 areas described above and the intermediate portion 18, which surrounds these two areas 16, 17. Thus, the first portion 13 further comprises a part of the pressure-side wall 6a and the core of the blade 3, which extends within the fibrous reinforcement 4 from the third lower limit 13a to the tip 11 and from a third "vertical" inner limit 13b (adjacent to the first inner limit 16 and to the second inner limit 17b) to the suction-side wall 6b. The part of the pressure-side wall 6a which is formed by the first portion 13 surrounds the damping area 16 and the confinement area 17 and comprises, from the leading edge 8 towards the trailing edge 9: the leading edge 8 (over the entire height H of the vane 7) to a third upstream limit 13c (located upstream of the first upstream limit 16c) and a part extending from a second "vertical" downstream limit 13d (located downstream of the first downstream limit 16d) as far as the trailing edge 9 bypassing the confinement area 17, where the first portion 13 stops at a fourth "vertical" upstream limit 13e (located upstream of the second upstream limit 17c) and a fourth "horizontal" lower limit 13f (located radially inside with respect to the second lower limit 17a). All these parts of the first portion 13 are formed integrally and in one-piece by three-dimensional weaving of the first strands 12 and are therefore connected to each other by first strands 12 only.

Figure 3:
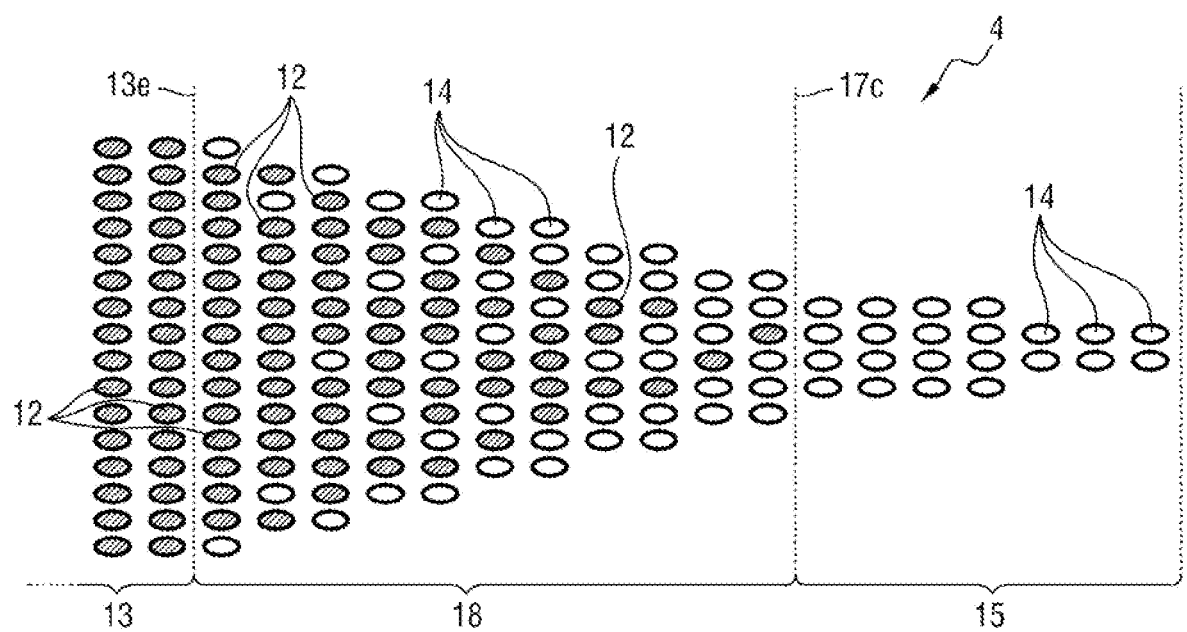
FIG. 3 is a partial and schematic sectional view of the blade along the axis B-B of FIG. 1.
Figure 4:
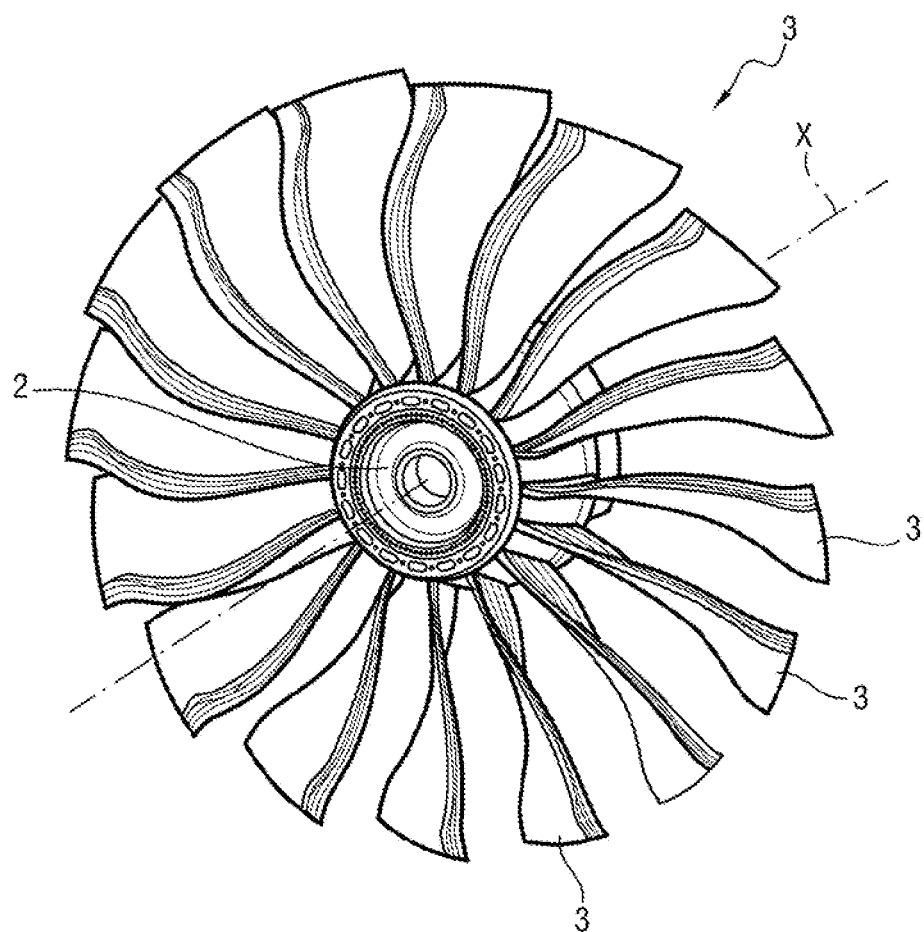
FIG. 4 is a perspective view of an example of a fan according to one embodiment of the invention.

The intermediate portion 18 extends between the "horizontal" limits (16a, 13a, 17a, 13f and "vertical" limits 16c, 13c, 16b, 13b, 16d, 13d, 17c, 13e, 17b and 13b described above, in order to allow a gradual transition in density and mechanical properties between the first portion 13 and the second portion 15 (see as an illustration FIG. 3). To this end, the intermediate portion 18 comprises a first part surrounding the damping area 16 of the second portion 15 and a second part surrounding the confinement area 17 of the second portion 15. Thus, the first part extends radially inside with respect to the damping area 16 (between the first lower limit 16a and the third lower limit 13a), between the leading edge 8 and the damping area 16 (between the third upstream limit 13c and the first upstream limit 16c), downstream of the damping area 16 of the tip 11 of the blade 3 to the third lower limit 13a (between the first downstream limit 16d and the second downstream limit 13d) and inside the fibrous reinforcement 4 (between the first inner limit and the second inner limit). The second part of the intermediate portion 18 extends radially inside with respect to the confinement area 17 (between the second lower limit 17a and the fourth lower limit 13f), upstream of the confinement area 17 (between the fourth upstream limit 13e and the second upstream limit 17c) and inside the fibrous reinforcement 4 (between the first inner limit 16b and the third inner limit 13b and between the second inner limit 17b and the third inner limit 13b). The first part and the second part of the intermediate portion 18 are each formed integrally and in one-piece by three-dimensional weaving of the first strands 12 and the second strands 14, the density of the first strands 12 gradually decreasing from the horizontal (respectively, vertical) limits adjacent to the first portion 13 towards the horizontal (respectively, vertical) limits adjacent to the second portion 15.

In this first embodiment, the two parts of the intermediate portion 18 can be produced by successively bringing out the first strands 12 of the weaving of the preform, at the different warp and/or weft planes constituting the parts of the intermediate portion 18 and by cutting them at the surface of the fibrous reinforcement 4 before injection, and by simultaneously introducing the second strands 14 between these warp and/or weft planes, as described in the document FR3087701. In this way, the first portion 13, the second portion 15 and the intermediate portion 18 are formed in one-piece during the three-dimensional weaving of the blade 3. In order to ensure the transition of the mechanical properties between the first portion 13 and the second portion 15 of the fibrous reinforcement 4 at the intermediate portion 18, the percentage with respect to the total number of warp strands in a column (and/or to the total number of weft strands in a row) of second strands 14 introduced between two columns of immediately adjacent warp strands, that is to say separated by only one line of weft strands (and/or between two lines of immediately adjacent weft strands, that is to say separated by only one column of warp strands) of the intermediate portion 18 is at most equal to 30%. Preferably, this percentage is comprised between 5% and 15%.

In a second embodiment, the fibrous reinforcement 4 comprises the first portion 13, the second portion 15 and the intermediate portion 18, the first portion 13 comprising the first strands 12 and second strands 14. The horizontal and vertical limits described above between the first portion 13, the second portion 15 and the intermediate portion 18 are identical in this second embodiment. On the other hand, in a first variant embodiment, the second warp strands 14 are inserted at the core from the root 5 of the blade and are brought to the surface at the horizontal and vertical limits described above so as to form the intermediate portion 18 and the second portion 15. The fibrous reinforcement 4 therefore comprises second warp strands 14 over the entire height H of the vane 7 and of the root 5. On the other hand, only the part of the first portion 13 which forms the core of the fibrous reinforcement 4 comprises second strands 14, the rest of the first portion 13 which forms the suction-side face 6b, the leading edge 8 and the trailing edge 9 being devoid of second strands 14 in order to ensure the mechanical strength of the blade 3.

In a second variant embodiment (which can be combined with the first variant), the second weft strands 14 are inserted over the entire chord C of the blade 3, over the height of the damping area 16 and of the intermediate portion 18, from the leading edge 8 and are brought to the surface at the horizontal and vertical limits described above so as to form the intermediate portion 18 and the second portion 15. The fibrous reinforcement 4 therefore comprises second warp strands 14 over the entire chord C of the blade, over the height of the damping area 16 of the second portion 15 and the height of the first part of the intermediate portion 18. On the other hand, only the part of the first portion 13 which extends over the height of the second portion 15 and of the intermediate portion 18, the root 5 and the lower part of the vane 7 being devoid of second strands 14 in order to ensure the mechanical strength of the blade 3.

In this second embodiment, the two parts of the intermediate portion 18 can be made by gradually burying the first strands 12 within the preform (towards the core) at the different warp and/or weft planes constituting the parts of the intermediate portion 18 and simultaneously bringing the second strands 14 to the surface from the core of the preform, at these warp and weft planes.

The first strands 12 have a high Young's modulus E, that is to say greater than 250 GPa, preferably greater than 270 GPa.

For example, the first strands 12 may comprise carbon fibers, typically HS T300 (E=284 GPa), HS TR30S (E=356 GPa) or HS T700 (E=395 GPa) carbon fibers or high modulus aramid fibers of the Dupont Kevlar 49 type (E=302 GPa).

The second strands 14 comprise a viscoelastic material which may comprise at least one of the following materials: an elastomeric material, polyurethane, rubber.

In general, the configurations described are valid for engines whose fan 1 can have an outside diameter of the order of 1.8 meters to 3 meters. The number of blades 3 of the fan 1 can be equal to 16 or 18. Regardless of the diameter of the fan 1, the number of fan blades 3 will be reduced as much as possible. Among various criteria, a choice of parameters (in particular the height of the damping area 16 and the depth of the second portion 15) will depend more particularly on the behavior of the fan blade and the "frequency/dimensioning in ingestion" combination. Indeed, for the same motor target, it is possible to choose different frequency behavior strategies or frequency responses in different cases of ingestion, for example to push back the blade and vane responses by avoiding vibration crossings with energy harmonics of the engine. For example, it is possible to make choices so as to position these crossings at transient engine speeds.

The hybridization of the strands of the fibrous reinforcement 4 also allows to open up the field of design thanks to the additional contribution in mechanical strength. For example, it becomes possible to refine the profile of the blade 3 at the leading edge 8 of the fibrous reinforcement 4 or the trailing edge 9 of the fibrous reinforcement 4 or over its entire height H in comparison with a blade comprising only the first strands (with high Young's modulus), which allows to optimize the mass of the blade 3 and the aerodynamic performance of the fan 1 (by obtaining thinner profiles or by reducing the hub ratio, which is related to the reduction in the centrifugal force induced by the mass of the blade 3).

The invention claimed is:

1. A blade comprising a structure, the structure being made of composite material and comprising a matrix and a fibrous reinforcement, the structure further comprising a pressure-side wall and a suction-side wall;
   wherein the fibrous reinforcement is embedded in the matrix, comprises a first portion forming the suction-side wall of the structure and a second portion forming the pressure-side wall of the structure, and is obtained by three-dimensional weaving of strands, the strands comprising;
   first strands and second strands;
   wherein the first strands comprise carbon or aramid fibers the Young's modulus of which is greater than 250 GPa; and
   wherein the second strands are produced from a viscoelastic material and have a Young's modulus less than 10 Gpa;
   wherein the first portion of the fibrous reinforcement comprises uniquely first strands whereas the second portion of the fibrous reinforcement comprises second strands.

2. The blade of claim 1, wherein the second portion has no first strands.

3. The blade of claim 1, further comprising a vane having aerodynamic profile capable of extending in an air flow having a determined height, the second portion of the fibrous reinforcement extending over at most sixty percent of the height of the vane from a tip of the vane.

4. The blade of claim 1, wherein the second portion of the fibrous reinforcement comprises a damping area extending over a portion of a length of a chord of the blade, the portion being comprised between zero percent and sixty percent of the length of the chord of the blade.

5. The blade of claim 1, wherein the second portion of the fibrous reinforcement comprises a confinement area comprising a trailing edge of the blade and a tip of the blade, the confinement area further extending over a portion of a length of a chord of the blade, the portion being at most equal to ten percent of the length of the chord of the blade.

6. The blade of claim 5, further comprising a vane having an aerodynamic profile capable of extending in an air flow having a determined height, the confinement area of the second portion extending over at most thirty percent of the height of the vane from a tip of the vane.

7. The blade (3) of claim 1, wherein the fibrous reinforcement further comprises a third portion extending between the first portion and the second portion, a density of the second strands gradually increasing in the third portion from the first portion towards the second portion.

8. The blade of claim 1, wherein the viscoelastic material comprises at least one of the following materials: an elastomer, polyurethane.

9. A fan comprising a disk carrying a plurality of the blades of claim 1.

10. A turbomachine comprising the fan of claim 9.

11. An aircraft comprising the turbomachine of claim 10.

12. The blade of claim 1, wherein the viscoelastic material comprises rubber.

13. A blade comprising a structure, the structure being made of composite material and comprising a matrix and a fibrous reinforcement, the structure further comprising a pressure-side wall and a suction-side wall;
   wherein the fibrous reinforcement is embedded in the matrix, comprises a first portion forming the suction-side wall of the structure and a second portion forming the pressure-side wall of the structure, and is obtained by three-dimensional weaving of strands, the strands comprising;

first strands and second strands;

wherein the first strands comprise carbon or aramid fibers the Young's modulus of which is greater than 250 GPa;

wherein the second strands are produced from a viscoelastic material and have a Young's modulus less than 10 Gpa;

wherein the first portion of the fibrous reinforcement comprises uniquely first strands whereas the second portion of the fibrous reinforcement comprises second strands; and wherein the fibrous reinforcement further comprises a third portion extending between the first portion and the second portion, a density of the second strands gradually increasing in the third portion from the first portion towards the second portion.

* * * * *